United States Patent [19]

Moeller

[11] Patent Number: 5,747,739

[45] Date of Patent: May 5, 1998

[54] ELECTRICAL OUTLET BOX

[76] Inventor: Larry Moeller, 144 Ulsterville Rd., Pine Bush, N.Y. 12566

[21] Appl. No.: 463,727

[22] Filed: Jun. 5, 1995

[51] Int. Cl.[6] .................................................. H02G 3/14
[52] U.S. Cl. ........................... 174/67; 174/53; 439/142; 220/242
[58] Field of Search ..................... 174/67, 53; 220/3.8, 220/242; 439/144, 142, 373, 370

[56] References Cited

U.S. PATENT DOCUMENTS

| | | | |
|---|---|---|---|
| 1,334,172 | 3/1920 | Ryerson | 439/144 |
| 4,058,358 | 11/1977 | Carlisle | 339/44 |
| 4,134,516 | 1/1979 | Sullo | 220/242 |
| 4,138,187 | 2/1979 | Brygger | 339/117 |
| 4,154,495 | 5/1979 | Crewse | 339/75 |
| 4,456,145 | 6/1984 | Frank | 220/242 |

Primary Examiner—Kristine L. Kincaid
Assistant Examiner—Dhiru R. Patel
Attorney, Agent, or Firm—Joseph L. Spiegel

[57] ABSTRACT

An electrical outlet box used in tractor trailer combinations includes a plate having an opening therethrough to provide access to an electrical outlet. A cover is pivotally mounted to a shaft spaced from and mounted parallel to the plate. A first spring is mounted about the shaft. A second spring which can also be mounted on the shaft or permanently or removably secured against the plate has a section which is spaced from but which bears across the exterior surface of the cover when a plug is inserted within the outlet. The first spring acts to bias the interior surface of the cover against the plate to enclose the opening when the outlet is not in use while the second spring acts to bias the interior surface against the plug's cable so as to prevent the plug from falling out of the outlet when the outlet is in use.

6 Claims, 2 Drawing Sheets

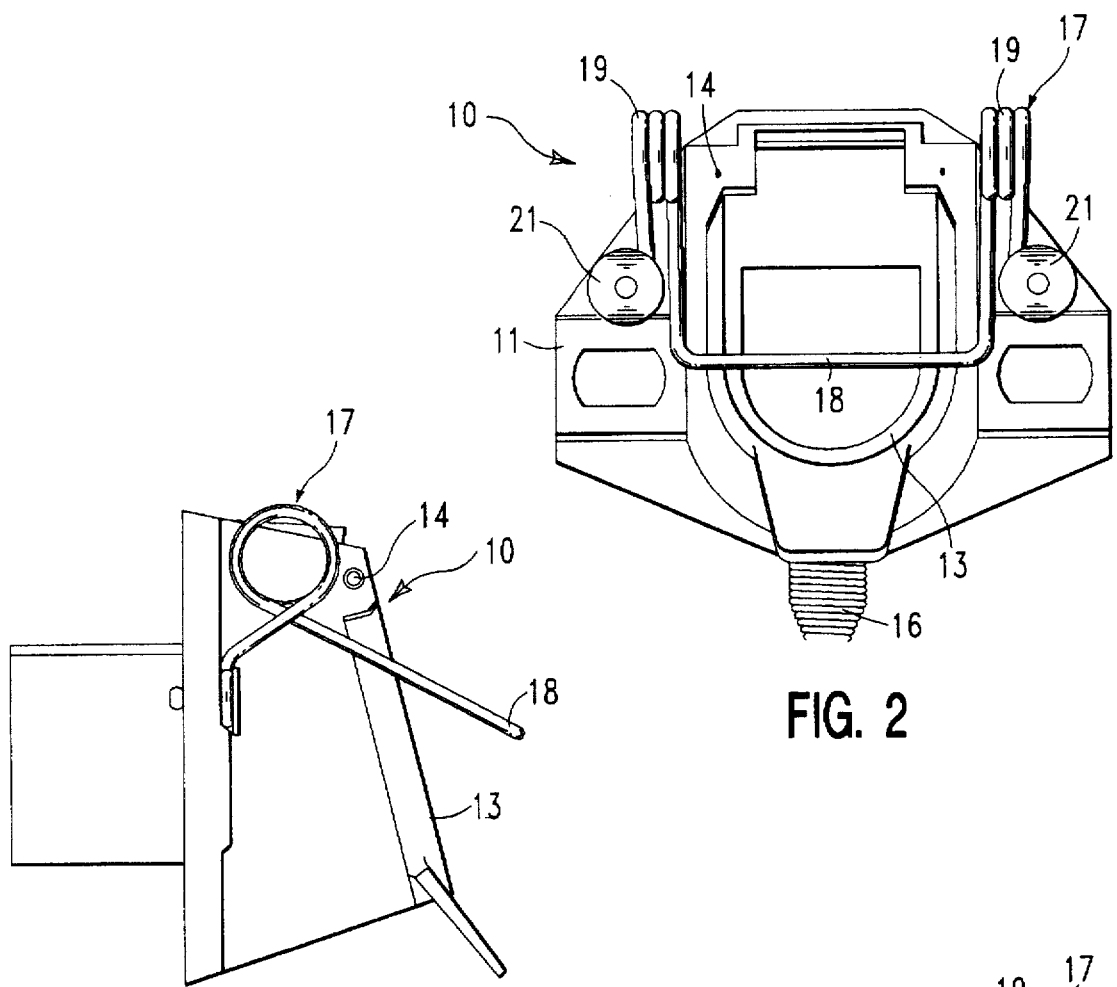
FIG. 1
FIG. 2
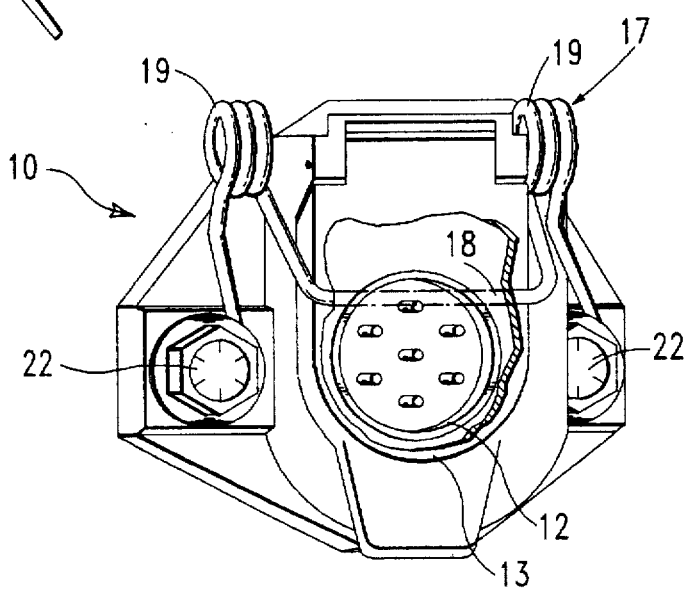
FIG. 3

ELECTRICAL OUTLET BOX

BACKGROUND OF THE INVENTION

1. Field of the Invention

This invention relates generally to electrical outlet boxes and, in particular, to electrical outlet boxes used in tractor trailer combinations.

2. Description of the Prior Art

In tractor trailer combinations commonly seen on highways today, the trailer has no independent power source. Power for the lights on the trailer is provided from the tractor battery via a cable extending from the tractor to the trailer.

The trailer has on its front wall an electrical outlet box while the cable has a plug on its end adapted to be inserted in the outlet. A cover on the front of the box is pivotally mounted to a shaft. A spring mounted about the shaft biases the door to enclose the outlet when not in use, but when the plug of a cable has been inserted in the outlet, the door is biased against the cable so that the cable plug will not fall out of the outlet.

A problem in the past has been that the small spring about the shaft breaks or clogs with debris and stops working. When the trailer hits a bump, the plug falls out of the outlet and the dangling cord gets destroyed and the electrical connection and power to the trailer is interrupted, meaning loss of lights on the rear of the trailer and down-time on the trailer and tractor until fixed.

Examples of prior art for electrical outlet boxes are found in U.S. Pat. Nos. 2,985,334 to Slater; 2,987,214 to Radack; 3,204,807 to Ramsing; 4,058,358 to Carlisle; 4,138,187 to Brygger; 4,394,552 to Schlosser; and, 4,456,145 to Frank.

SUMMARY OF THE INVENTION

A primary object of the invention is an improved electrical outlet box for use on tractor trailer combinations that would prevent the plug of a cable from falling out of the outlet during travel.

These and other objects, features, and advantages of the present invention are accomplished in accordance with the teachings of the present invention, one embodiment of which comprises an electrical outlet box used in tractor trailer combinations that includes a plate having an opening therethrough to provide access to an electrical outlet. A cover is pivotally mounted to a shaft spaced from and mounted parallel to the plate. A first spring is mounted about the shaft. A second spring which can also be mounted on the shaft or permanently or removably secured against the plate has a section which is spaced from but which bears across the exterior surface of the cover when a plug is inserted within the outlet. The first spring acts to bias the interior surface of the cover against the plate to enclose the opening when the outlet is not in use while the second spring acts to bias the interior surface against the cable so as to prevent the plug from falling out of the outlet when the outlet is in use.

BRIEF DESCRIPTION OF THE DRAWING

Other objects, features, and advantages of the invention will be apparent from the following detailed description and accompanying drawing wherein:

FIG. 1 is a side view of a first embodiment of an electrical outlet box when not in use;

FIG. 2 is a front view of the first embodiment depicted in FIG. 1 when in use with cable plug inserted in the outlet;

FIG. 3 is a perspective view of a second embodiment of an electrical outlet box when not in use;

DESCRIPTION OF THE PREFERRED EMBODIMENT

Figure 4:
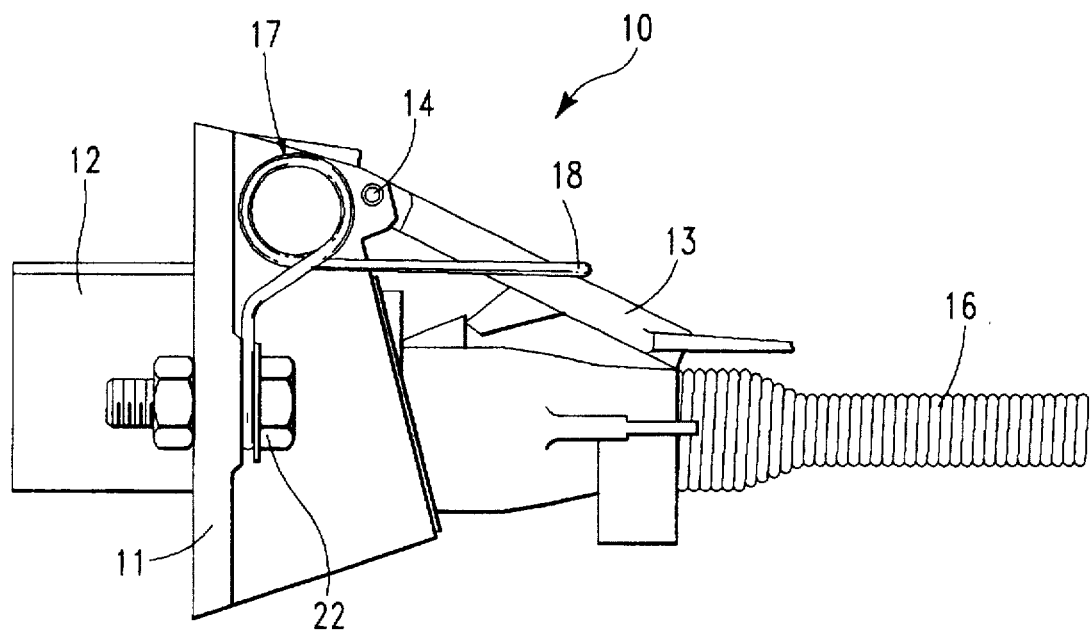
FIG. 4 is a side view of the second embodiment depicted in FIG. 3 when in use with cable plug inserted in outlet; and, FIG. 5 is a front view of a third embodiment of an electrical outlet box when in use with cable plug inserted in the outlet.

Referring now to the drawing and first to FIGS. 1 and 2, a first embodiment of an article constructed in accordance with the teachings of the present invention is disclosed. An electrical outlet box 10 is disclosed. The outlet box 10 is mounted on the front wall of a trailer (not shown). An outlet box may also be mounted on the rear of a trailer for insertion of a cable between the outlet box on the rear of a trailer and a front outlet box of a next trailer such as when a double header is running. The outlet box includes a plate 11 with an opening therein providing access to an electrical outlet 12. A cover 13 is pivotally mounted to a shaft 14 on the front plate 11 of the box 10 above the outlet 12. A spring 15 (see FIG. 5) mounted about the shaft 14 biases the cover 13 to enclose the outlet 12 when not in use, but when the plug of a cable 16 has been inserted in the outlet 12, the cover 13 is biased against the cable 16 so that the cable plug will not fall out of the outlet 12.

What has been described thus far is the prior art. A problem in the past has been that the spring 15 about the shaft 14 tends to break or clogs with debris and stops working. Since the cover 13 would no longer be biased against the cable 16, when a plug is installed in the outlet 12 the plug frequently falls out of the outlet, as when the trailer hits a bump.

In accordance with the present invention a second spring 17 of any typical type spring metal is in some manner affixed to the box 10 and includes a section 18 which is spaced from but which crosses over the cover 13 and at an approximate mid point of the cover 13. The spring 17 is seen as curled towards either end at 19.

In a first embodiment depicted in FIGS. 1 and 2, the ends of the spring 17 are riveted at 21 to the front of the plate.

In a second embodiment depicted in FIGS. 3 and 4, the ends of the spring 17 are secured to the bolts 22 used to fasten the outlet box 10 to the front wall of the trailer.

Figure 5:
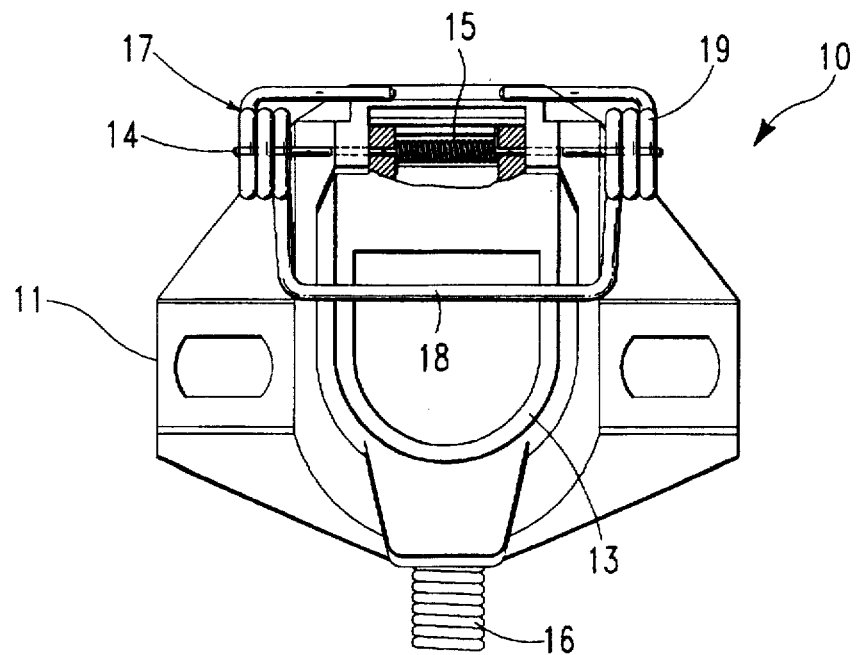

In a third embodiment depicted in FIG. 5, the shaft 14 is extended beyond the ends of the cover and the curled portions 19 of the spring 17 are mounted on the extended ends of the shaft 14.

When the outlet 12 is not in use, the first small spring 15 biases the interior surface of the cover 13 against the plate 11 to enclose the outlet 12. In this mode the section 18 of the second spring 17 (as best seen in FIG. 1) is spaced from the cover 13. However, when a plug has been inserted in the outlet 12 (as best seen in FIG. 4) the section 18 of the second spring 17 is so positioned as to bias the interior surface of the cover 13 against the plug's cable 16 so as to prevent the plug from falling out of the outlet 12 when in use.

The first two embodiments lend themselves to use when one is simply going to add a second spring to an existing outlet box, while the third embodiment is for new manufacture at the factory. With a plug inserted in the outlet, the tension on the cover is such that a forty pound pull will remove the plug from the outlet without ripping out the interior outlet box from the trailer.

The invention is also useful for outlet boxes on recreational trailers and campers.

It should be obvious that changes, additions and omissions may be made in the details and arrangement of parts without departing from the scope of the invention as defined in the appended claims.

What is claimed is:

1. An electrical outlet box comprising:

a plate having an opening therethrough to provide access to an electrical outlet for receipt of a cable with a plug at its end;

a cover pivotally mounted on the plate and having an interior and exterior surface;

a first spring for normally biasing the interior surface of the cover against the plate to enclose the opening when the outlet is not in use; and a second spring affixed to the plate having a section so positioned as to be spaced from the cover when the outlet is not in use and to bias the interior surface of the cover against the cable so as to prevent the plug from falling out of the outlet when the outlet is in use.

2. An electrical outlet box comprising:

a plate having an opening therethrough to provide access to an electrical outlet for receipt of a cable with a plug at its end;

a shaft spaced from and mounted parallel to the plate;

a cover pivotally mounted on the shaft and having an interior and exterior surface; and, a first spring mounted about the shaft for normally biasing the interior surface of the cover against the plate to enclose the opening when the outlet is not in use;

a second spring affixed to the plate having a section so positioned to be spaced from the cover when the outlet is not in use and to bias the interior surface of the cover against the cable so as to prevent the plug from falling out of the outlet when the outlet is in use.

3. The invention defined by claim 2 wherein the second spring is riveted to the plate.

4. The invention defined by claim 2 wherein the second spring is screwed against the plate.

5. The invention defined by claim 2 wherein the second spring is mounted on the shaft.

6. The invention defined by claim 2 wherein the second spring section bears across a midpoint of the exterior surface of the cover when the outlet is in use.

* * * * *